United States Patent
Shukunami et al.

(10) Patent No.: US 7,209,284 B2
(45) Date of Patent: Apr. 24, 2007

(54) OPTICAL AMPLIFIER USING REFLECTION-TYPE VARIABLE OPTICAL ATTENUATOR FOR FEEDBACK

(75) Inventors: Norifumi Shukunami, Yokohama (JP); Norihisa Naganuma, Yokohama (JP); Yuichi Suzuki, Yokohama (JP); Takashi Ishiwada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/185,874

(22) Filed: Jul. 21, 2005

(65) Prior Publication Data

US 2005/0270635 A1 Dec. 8, 2005

Related U.S. Application Data

(63) Continuation of application No. PCT/JP03/08063, filed on Jun. 25, 2003.

(51) Int. Cl.
*H01S 4/00* (2006.01)
*G02B 26/02* (2006.01)
*G02B 5/30* (2006.01)
*G02F 1/19* (2006.01)

(52) U.S. Cl. .................. 359/341.41; 359/298; 359/301; 359/495

(58) Field of Classification Search ............... 359/301, 359/298, 495, 341.41
See application file for complete search history.

(56) References Cited

U.S. PATENT DOCUMENTS

| | | | | |
|---|---|---|---|---|
| 5,191,467 A | * | 3/1993 | Kapany et al. | 359/337 |
| 5,471,340 A | * | 11/1995 | Cheng et al. | 359/281 |
| 5,768,005 A | * | 6/1998 | Cheng et al. | 359/281 |
| 6,049,412 A | * | 4/2000 | Bergmann et al. | 359/301 |
| 6,304,697 B1 | | 10/2001 | Toyohara | |
| 6,333,806 B1 | * | 12/2001 | Onaka et al. | 359/283 |
| 6,411,429 B1 | | 6/2002 | Tomofuji et al. | |

(Continued)

FOREIGN PATENT DOCUMENTS

JP 09-054285 2/1997

(Continued)

OTHER PUBLICATIONS

Patent Abstracts of Japan, Publication No. 09-145929, Published Jun. 6, 1997.

(Continued)

*Primary Examiner*—Deandra M. Hughes
*Assistant Examiner*—Eric Bolda
(74) *Attorney, Agent, or Firm*—Staas & Halsey LLP

(57) ABSTRACT

An optical apparatus which is reduced in the number of optical devices arranged on a main optical signal transmission path, thereby reducing the size and cost of the device, and which is improved in optical transmission quality. An optical amplifier includes an amplification medium, which is doped with an active material for optical amplification and to which pump light is introduced, for amplifying an optical signal to be output. A reflection-type variable optical attenuator includes a reflecting mirror for reflecting an input light to generate a reflected light, and a magneto-optical crystal arranged in a position where the input and reflected lights pass. The magneto-optical crystal is applied with a magnetic field to induce a Faraday rotation angle therein and thereby vary an attenuation amount of the amplified optical signal, and part of light transmitted through the reflecting mirror is converted, as input monitor light, into an electrical signal.

5 Claims, 12 Drawing Sheets

U.S. PATENT DOCUMENTS

| | | | |
|---|---|---|---|
| 6,535,330 B1* | 3/2003 | Lelic et al. | 359/337.13 |
| 6,570,699 B2* | 5/2003 | Onaka et al. | 359/281 |
| 6,631,238 B2* | 10/2003 | Liu et al. | 385/140 |
| 6,870,675 B2* | 3/2005 | Ikeda et al. | 359/484 |

OTHER PUBLICATIONS

Patent Abstracts of Japan, Publication No. 09-179152, Published Jul. 11, 1997.

Patent Abstracts of Japan, Publication No. 09-214433, Published Aug. 15, 1997.

Patent Abstracts of Japan, Publication No. 10-158857, Published Jun. 16, 1998.

Patent Abstracts of Japan, Publication No. 10-161076, Published Jun. 19, 1998.

Patent Abstracts of Japan, Publication No. 11-119178, Published Apr. 30, 1999.

Patent Abstracts of Japan, Publication No. 2000-091677, Published Mar. 31, 2000.

International Search Report dated Aug. 12, 2003 in corresponding Application PCT/JP2003/008063.

* cited by examiner

OPTICAL AMPLIFIER USING REFLECTION-TYPE VARIABLE OPTICAL ATTENUATOR FOR FEEDBACK

This application is a continuing application, filed under 35 U.S.C. § 111(a), of International Application PCT/JP2003/008063, filed Jun. 25, 2003.

BACKGROUND OF THE INVENTION

1. Field of the Invention

The present invention relates to optical apparatus, and more particularly, to an optical apparatus for amplifying an optical signal.

2. Description of the Related Art

In recent years, much attention and development are directed to DWDM (Dense Wavelength Division Multiplexing) which permits a single optical fiber to accommodate several tens to several hundreds of wavelength channels each capable of transmitting data at high rates of 600 Mbps to 10 Gbps, thereby enabling data transmission of an extremely large total capacity of the order of Tbps.

In optical amplification techniques for WDM systems including DWDM, EDFA (Erbium-Doped Fiber Amplifier) is widely used. EDFA is an optical amplifier using an EDF (Erbium ($Er^{3+}$)-Doped Fiber) as an amplification medium. An optical signal is propagated through the EDF with pump light introduced to the EDF, so that the optical signal is amplified by the stimulated emission then induced. The EDFA has a wide gain bandwidth and is capable of collectively amplifying multiple optical signals in the wavelength band; therefore, the EDFA is used as a primary device in WDM repeaters.

FIG. 12 shows the configuration of a conventional EDFA. An optical amplifier (EDFA) 100 comprises a coupler C1, a pump LD (Laser Diode) 101, an EDF 102, optical isolators 103 and 107, a gain equalizer 104, a BS (Beam Splitter) 105, a variable attenuator (ATT) 106, a PD (Photo-Diode) 108, and a controller 109.

An input optical signal is introduced, together with pump light emitted from the pump LD 101, into the EDF 102 via the coupler C1, whereby the optical signal is amplified. The amplified optical signal is passed through the optical isolator 103 and the gain thereof is equalized (gain-wavelength characteristic of the EDF 102 is flattened) by the gain equalizer 104.

After passing through the gain equalizer 104, the optical signal is split into two by the BS 105. The variable attenuator 106 controls the level of one split optical signal, and the level-controlled optical signal is output through the optical isolator 107. The PD 108 converts the other split optical signal to an electrical signal, which is monitored by the controller 109. In accordance with the monitoring result, the controller 109 controls the power of pump light emitted from the pump LD 101.

Each of the optical isolators permits only the required light to transmit therethrough in the direction indicated by the arrow in the figure and does not transmit light in the opposite direction. Accordingly, by arranging the optical isolator 107 in the illustrated position, it is possible to cut off feedback light of the optical signal returned from a reflecting point in the optical fiber transmission path.

Also, the optical isolator has the property of absorbing incident light with wavelengths of 1 micron and less. This is because a YIG (Yttrium-Iron-Garnet) crystal, which is very often used in the optical isolator as a magneto-optical crystal, absorbs light with wavelengths of 1 micron and less.

Accordingly, by arranging the optical isolator 103 in the illustrated position, it is possible to absorb the pump light having a wavelength of 0.98 microns. As a result, only the optical signal from which the pump light is removed is input to individual devices succeeding the EDF 102, making it possible to avoid the situation where the optical signal containing the pump light enters the PD 108, for example, which causes errors in the monitored signal level.

As conventional techniques, there has also been proposed an optical amplifier using an optical isolator module which has a single optical isolator arranged between two collimating lenses and which functions as if it has two optical isolators (e.g., Unexamined Japanese Patent Publication No. H09-54285 (paragraph nos. [0015] to [0022], FIG. 2)).

An optical amplifier is constituted by various devices as mentioned above, and among them, an optical isolator in particular is an optical device which plays an important role in enhancing the quality of optical amplification control. However, an optical isolator is one of the most expensive optical passive devices and entails an increase in cost (in the optical amplifier 100, an expensive optical isolator 103 is used to cut off the 0.98-micron pump light). Also, the use of an optical isolator makes it difficult to reduce the size of the device.

In the optical amplifier 100, on the other hand, the optical signal output from the EDF 102 needs to be monitored through the PD 108, in order to perform feedback control on the pump light power. To permit the optical signal monitoring, the BS 105 is used to split the optical signal, but since the BS 105 arranged on the optical signal (main optical signal) transmission path is a lossy medium entailing optical loss, deterioration in the OSNR (Optical Signal/Noise Ratio) is caused. It is therefore desirable that the transmission path through which the main optical signal is propagated should include the smallest possible number of lossy media as optical components.

SUMMARY OF THE INVENTION

The present invention was created in view of the above circumstances, and an object thereof is to provide an optical apparatus which is reduced in the number of optical devices arranged on a main optical signal transmission path, thereby reducing the size and cost of the device, and which is improved in optical transmission quality.

To achieve the object, there is provided an optical apparatus for amplifying an optical signal. The optical apparatus comprises an optical amplifier including an amplification medium which is doped with an active material for optical amplification and to which pump light is introduced, for amplifying an optical signal and outputting the amplified optical signal, and a reflection-type variable optical attenuator including a reflecting mirror for reflecting an input light to generate a reflected light, and a magneto-optical crystal arranged in a position where the input light and the reflected light pass, the magneto-optical crystal being applied with a magnetic field to induce a Faraday rotation angle therein and thereby vary an amount of attenuation of the amplified optical signal, and part of light transmitted through the reflecting mirror being converted, as input monitor light, into an electrical signal.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
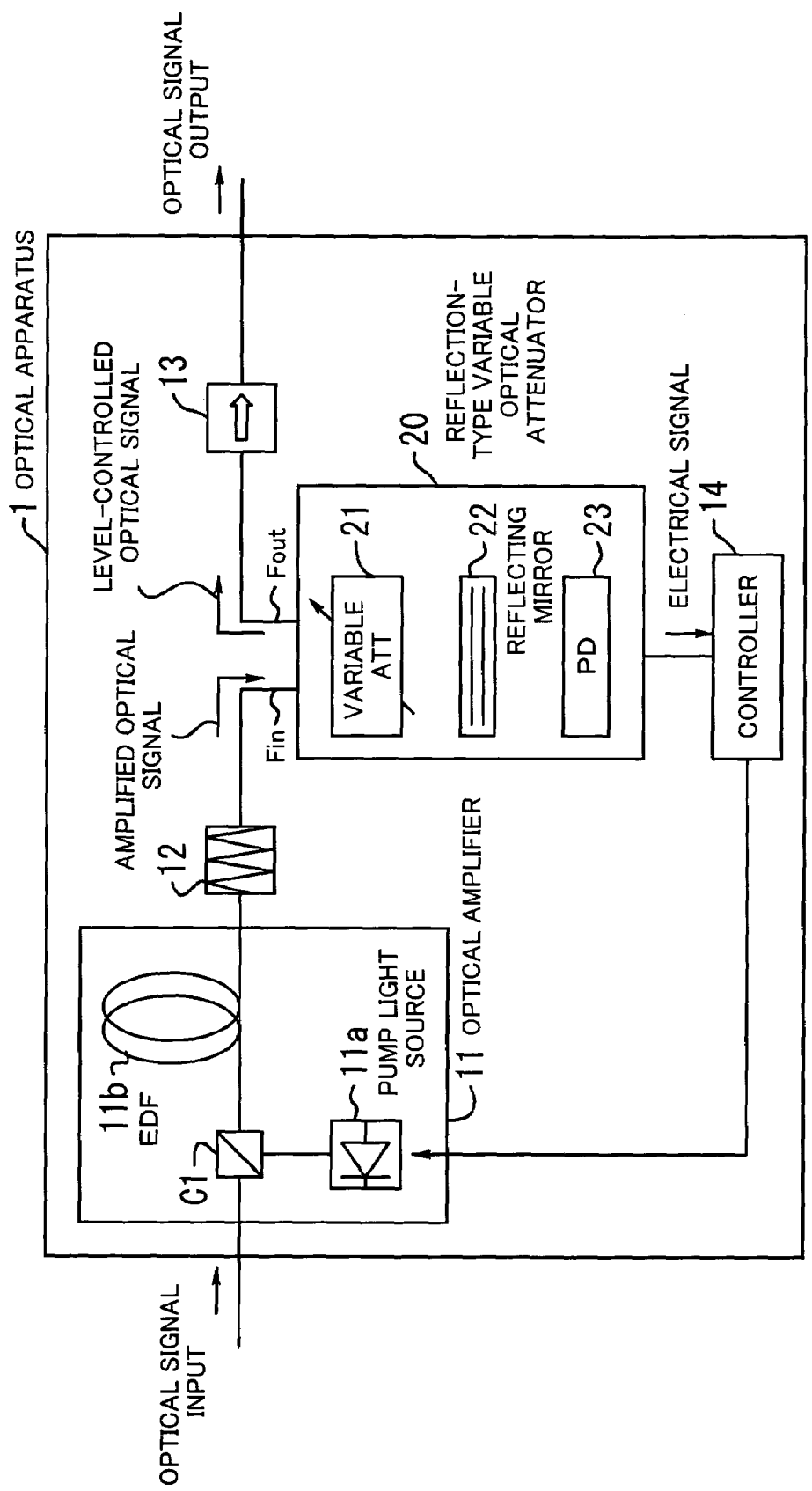
FIG. 1 illustrates the principle of an optical apparatus according to the present invention.

Preferred embodiments of the present invention will be described below with reference to the accompanying drawings, wherein like reference numerals refer to like elements throughout. FIG. 1 illustrates the principle of an optical apparatus according to the present invention. The optical apparatus 1 comprises an optical amplifier 11, a gain equalizer 12, an optical isolator 13, a controller 14, and a reflection-type variable optical attenuator 20. The optical amplifier 11 includes a pump light source 11a, an EDF 11b, and a coupler C1. The reflection-type variable optical attenuator 20 includes a variable attenuator 21, a reflecting mirror 22, and a light-receiving element (PD) 23.

In the optical amplifier 11, pump light from the pump light source 11a is introduced, via the coupler C1, into an amplification medium (hereinafter EDF) doped with an active material for optical amplification (the pump light has a wavelength band of 1 micron or less, e.g., 0.98 microns). Consequently, an optical signal is amplified and the resultant amplified optical signal is output from the EDF 11b.

The reflection-type variable optical attenuator 20 is input via an input fiber Fin with the amplified optical signal of which the gain has been equalized by the gain equalizer 12, then performs level control (attenuation control) on the input optical signal, and outputs the level-controlled optical signal from an output fiber Fout. The level-controlled optical signal is then output through the optical isolator 13 to an optical fiber transmission path.

In the reflection-type variable optical attenuator 20, the reflecting mirror 22 reflects the input light to generate a reflected light, and a magneto-optical crystal (included in the variable attenuator 21) is arranged in a position where the input light and the reflected light pass. The magneto-optical crystal is applied with a magnetic field to induce a Faraday rotation angle therein and thereby vary the amount of attenuation of the amplified optical signal.

The PD 23 converts part of light transmitted through the reflecting mirror 22, as input monitor light, into an electrical signal. The controller 14 monitors the electrical signal and, in accordance with the monitoring result, controls the pump light power emitted from the pump light source 11a. The configuration and operation of the reflection-type variable optical attenuator 20 will be described in detail later.

Figure 12:
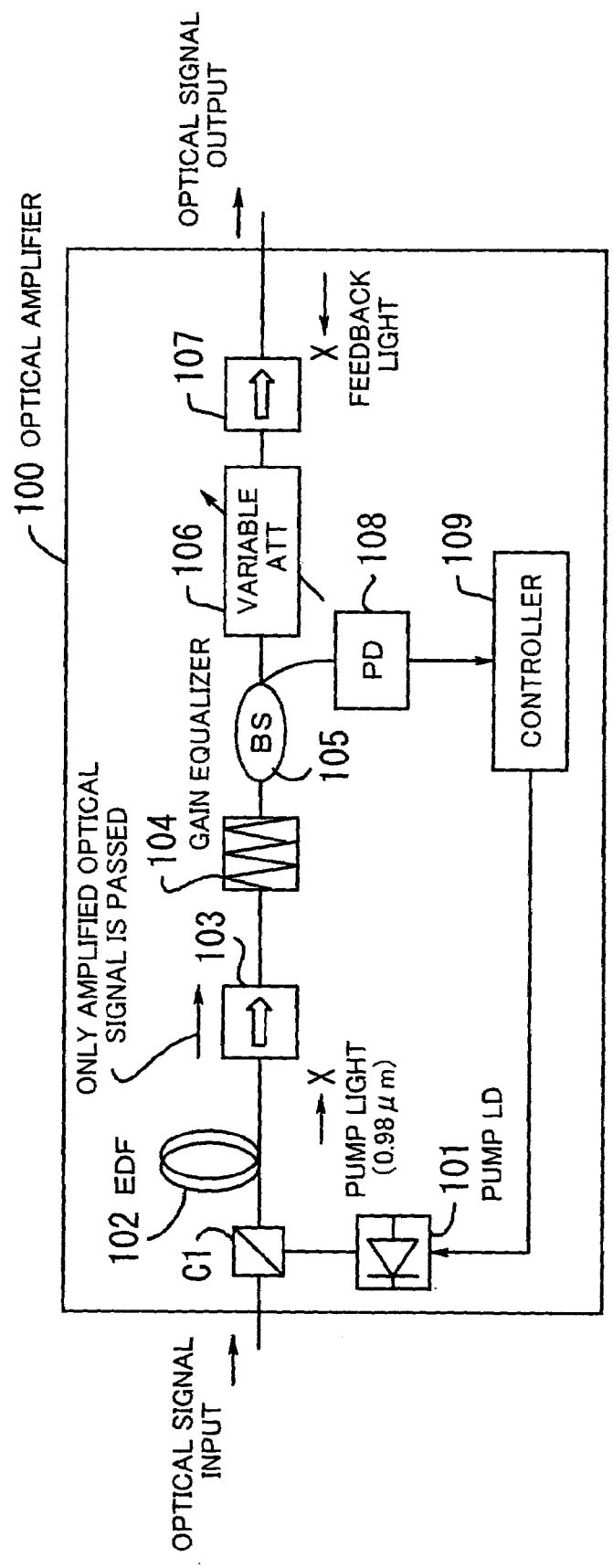
FIG. 12 shows the configuration of a conventional EDFA.

The reflection-type variable optical attenuator 20 is a device having a variable optical attenuation control function and a monitoring function. Because of the use of the device, the optical amplifier 1 of the present invention does not require optical devices, such as the optical isolator 103 and the beam splitter 105 in the conventional optical amplifier 100 shown in FIG. 12, to be inserted in the transmission path through which the main optical signal is propagated. This not only permits reduction in size and cost of the device but eliminates optical loss which constitutes noise during optical signal transmission, whereby optical transmission quality (OSNR) can be improved.

Figure 2:
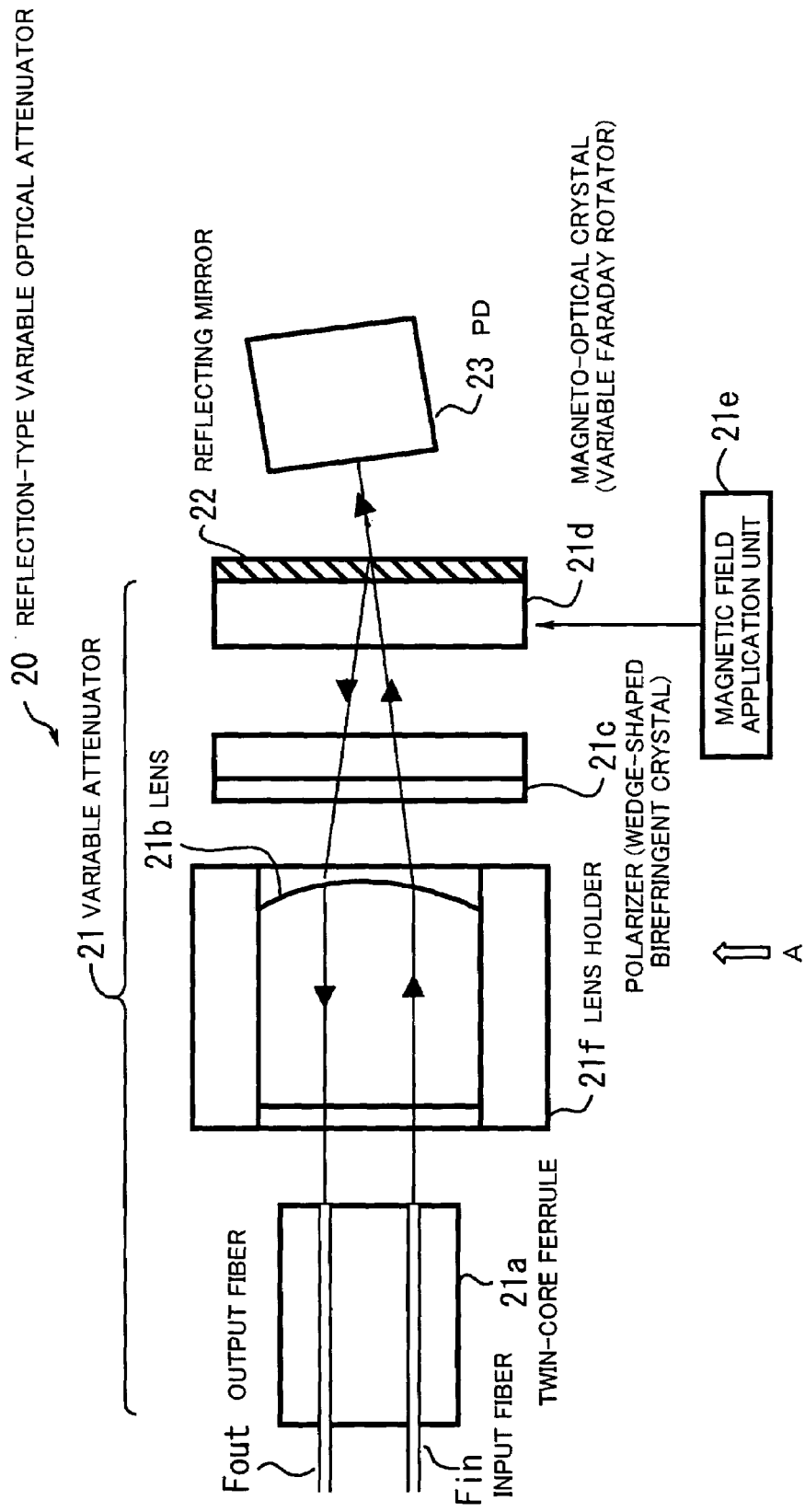
FIG. 2 shows the configuration of a reflection-type variable optical attenuator.

The configuration and operation of the reflection-type variable optical attenuator 20 will be now described in detail. FIG. 2 is a plan view showing the configuration of the reflection-type variable optical attenuator 20. The reflection-type variable optical attenuator 20 comprises a twin-core ferrule 21a, a lens 21b, a lens holder 21f, a polarizer 21c, a magneto-optical crystal 21d, a magnetic field application unit 21e, the reflecting mirror 22, and the PD 23. The twin-core ferrule 21a, the lens 21b, the lens holder 21f, the polarizer 21c, the magneto-optical crystal 21d and the magnetic field application unit 21e constitute the variable attenuator 21.

The twin-core ferrule 21a has two optical fiber insertion holes in which are inserted and fixed two optical fibers, namely, the input fiber Fin (for the input of the amplified optical signal) and the output fiber Fout (for the output of the attenuation-controlled optical signal).

The lens 21b is secured to the lens holder 21f and transforms (collimates) light spreading in the direction of propagation into a parallel light. The polarizer 21c passes a linearly polarized light of light input thereto. For the polarizer 21c, a wedge-shaped birefringent crystal (hereinafter referred to as wedge plate) is used.

The reflecting mirror (half mirror) 22 reflects the input light to generate a reflected light. The reflecting mirror is not a mirror of which the intensities of transmitted and reflected lights are exactly the same, but is a mirror adapted to reflect part of the input light and transmit the remaining part therethrough.

The magneto-optical crystal (variable Faraday rotator) 21d is arranged in a position where the input light and the reflected light pass and is applied with a magnetic field to induce a change of Faraday rotation angle therein and thereby vary the amount of attenuation of the amplified optical signal (the plane of polarization of the transmitted light is rotated by the magnetic field to control the substantial optical transmittance).

For the magneto-optical crystal 21d, YIG crystal is mainly used. YIG crystal is not optically transparent in the wavelength region of 1 micron and less and therefore cuts off light with wavelengths of 1 micron and less (i.e., the pump light).

The magnetic field application unit 21e applies a magnetic field to the magneto-optical crystal 21d. The PD 23 converts part of light transmitted through the reflecting mirror 22, as input monitor light, into an electrical signal. The reflectance of the reflecting mirror 22 is set such that 99% of the main optical signal is reflected while 1% of same is transmitted, for example.

Figure 3:
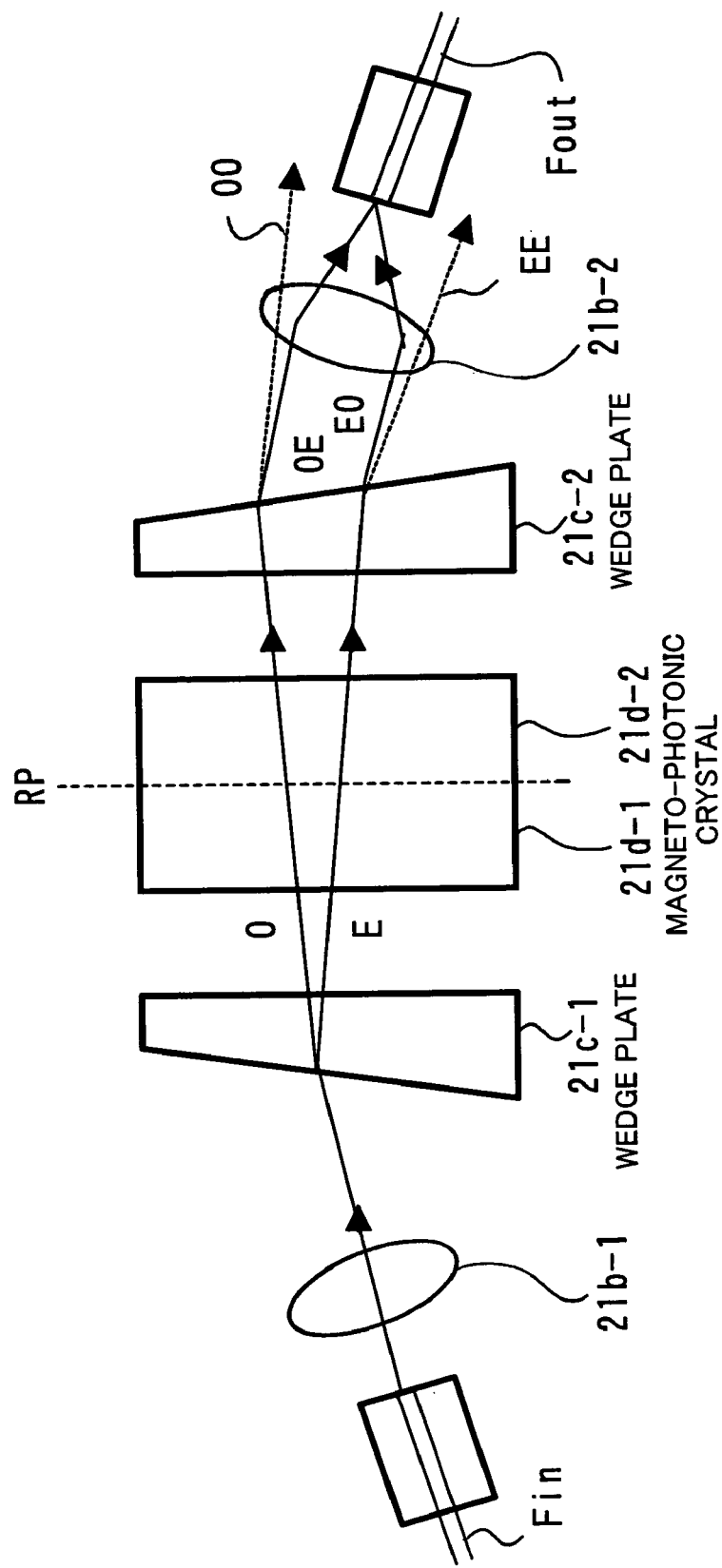
FIG. 3 illustrates the operation of a variable attenuator.

The operation of the variable attenuator 21 will be now described in more detail. FIG. 3 illustrates the operation of the variable attenuator 21. Because of the use of the reflecting mirror 22, the operation of the variable attenuator 21 in FIG. 2 can be depicted as shown in FIG. 3 wherein the elements of the variable attenuator are illustrated on both sides of a reflection plane RP of the reflecting mirror 22 (the elements of the variable attenuator are shown in an unfolded manner as viewed in the direction of arrow A in FIG. 2; the magnetic field application unit 21e and the PD 23 are not illustrated in FIG. 3). Referring to the illustrated configuration, the operation of the variable attenuator will be explained.

Light radiated from the input fiber Fin is collimated and thus transformed into a parallel light (input light) by the lens 21b-1. The input light is then separated into an ordinary light O and an extraordinary light E by the wedge plate 21c-1. The plane of polarization of the ordinary light O is at right angles to that of the extraordinary light E.

The planes of polarization of the ordinary and extraordinary lights O and E are rotated toward their respective propagation directions at the same angle by the magneto-optical crystal 21d-1, 21d-2. The ordinary light O of which the plane of polarization has been rotated is further separated into an ordinary light OO and an extraordinary light OE by the wedge plate 21c-2, and the extraordinary light E of which the plane of polarization has also been rotated is similarly separated into an ordinary light EO and an extraordinary light EE by the wedge plate 21c-2.

The extraordinary light OE has been refracted as an ordinary light by the wedge plate 21c-1 and then refracted as an extraordinary light by the wedge plate 21c-2. The ordinary light OO has been refracted as an ordinary light by the wedge plate 21c-1 and the wedge plate 21c-2.

Also, the ordinary light EO has been refracted as an extraordinary light by the wedge plate 21c-1 and then refracted as an ordinary light by the wedge plate 21c-2. The extraordinary light EE has been refracted as an extraordinary light by the wedge plate 21c-1 and the wedge plate 21c-2.

The wedge plate 21c-1 and the wedge plate 21c-2 are of the same shape, and thus the extraordinary light OE and the ordinary light EO are parallel with each other. Accordingly, the extraordinary and ordinary lights OE and EO can be focused by the lens 21b-2 so as to fall on the core of the output fiber Fout. The ordinary and extraordinary lights OO and EE are not parallel with each other and are divergent; therefore, these lights are scarcely focused onto the core of the output fiber Fout even if passed through the lens 21b-2.

When the strength of the magnetic field applied to the magneto-optical crystal 21d is "0", the Faraday rotation angle is 90 degrees, and the ordinary light O emitted from the magneto-optical crystal 21d is in its entirety refracted as the extraordinary light OE by the wedge plate 21c-2. Also, the extraordinary light E emitted from the magneto-optical crystal 21d is in its entirety refracted as the ordinary light EO by the wedge plate 21c-2. In this case, therefore, all of the input light is focused onto the core of the output fiber Fout and the loss is, ideally, "0".

On the other hand, when the strength of the magnetic field applied to the magneto-optical crystal 21d is sufficiently high, the Faraday rotation angle is close to 0 degrees, and the ordinary light O emitted from the magneto-optical crystal 21d is refracted as the ordinary light OO by the wedge plate 21c-2. Also, the extraordinary light E emitted from the magneto-optical crystal 21d is refracted as the extraordinary light EE by the wedge plate 21c-2. Accordingly, in this case, the input light is hardly focused onto the core of the output fiber Fout and the loss is at a maximum. When the Faraday rotation angle is at an intermediate angle between 0 and 90 degrees, the loss shows an intermediate value.

In this manner, the Faraday rotation angle changes within the range from 90 to 0 degrees depending on the strength of the magnetic field applied to the magneto-optical crystal 21d, and since the amount of light focused onto the core of the output fiber Fout varies in accordance with the Faraday rotation angle, variable optical attenuation function can be performed.

Figure 4:
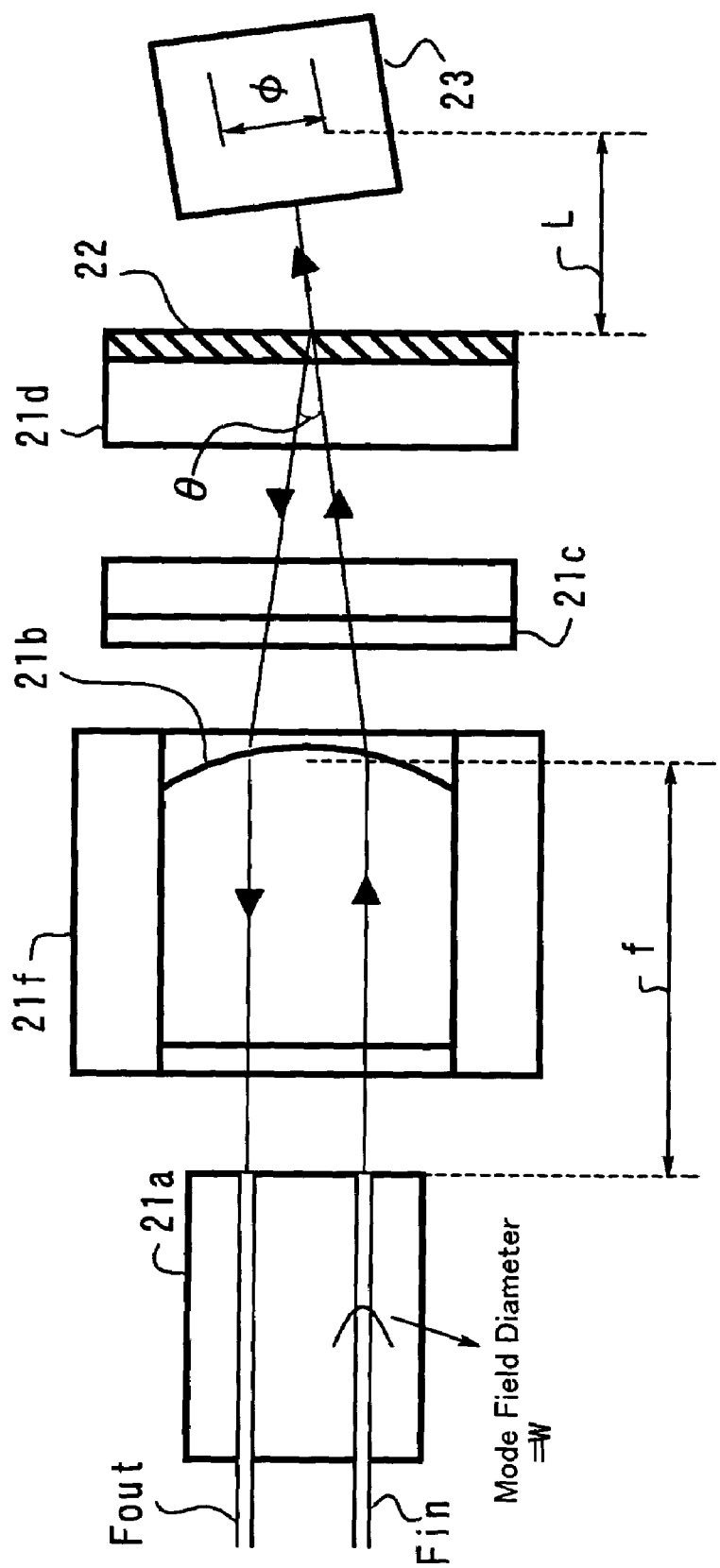
FIG. 4 illustrates the position where a PD is arranged.

The following describes the manner of how the PD 23 is arranged. FIG. 4 illustrates the position where the PD 23 is placed. The PD 23 is a device provided in the reflection-type variable optical attenuator 20 for detecting an optical level and converts part of light transmitted through the reflecting mirror 22 into an electrical signal, which is sent to the controller 14.

In the case where the PD 23 is arranged behind the reflecting mirror 22, the PD needs to be positioned so as not to detect the intensity of feedback light which is returned from a reflecting point succeeding the reflection-type variable optical attenuator 20 after being emitted from the output fiber Fout. Such feedback light constitutes noise in monitoring the intensity of light input to the reflection-type variable optical attenuator 20, and thus, if the PD 23 detects feedback light, then the detection accuracy thereof lowers. It is therefore necessary that the PD 23 should be displaced from the optical axis of the feedback light.

In the exemplary device configuration shown in FIG. 1, the optical isolator 13 is provided to cut off the feedback light, and in this case, no particular care needs to be taken as to the positioning of the PD 23. However, in order for the reflection-type variable optical attenuator 20 of the present invention to be applied to other devices not including the optical isolator, the PD 23 is displaced from the optical axis of the feedback light.

In the case of restricting the leak of the feedback light to −5 dB or less, the distance L (mm) of the PD 23 from the back of the reflecting mirror 22 is set so as to fall within a range of $L > \{((4\lambda f/\pi w) + \phi)\cos(\theta/2)\}/4 \tan(\theta/2)$, where $\theta$ (deg) is the angle between the feedback light and the input monitor light, $\phi$ (mm) is the size of the light receiving surface of the PD 23, f (mm) is the focal distance of the lens 21b, $\lambda$ (μm) is the wavelength of the light, and w (μm) is the mode field diameter of the light in the fiber, whereby the input of the feedback light to the PD 23 can be suppressed.

Figure 5:
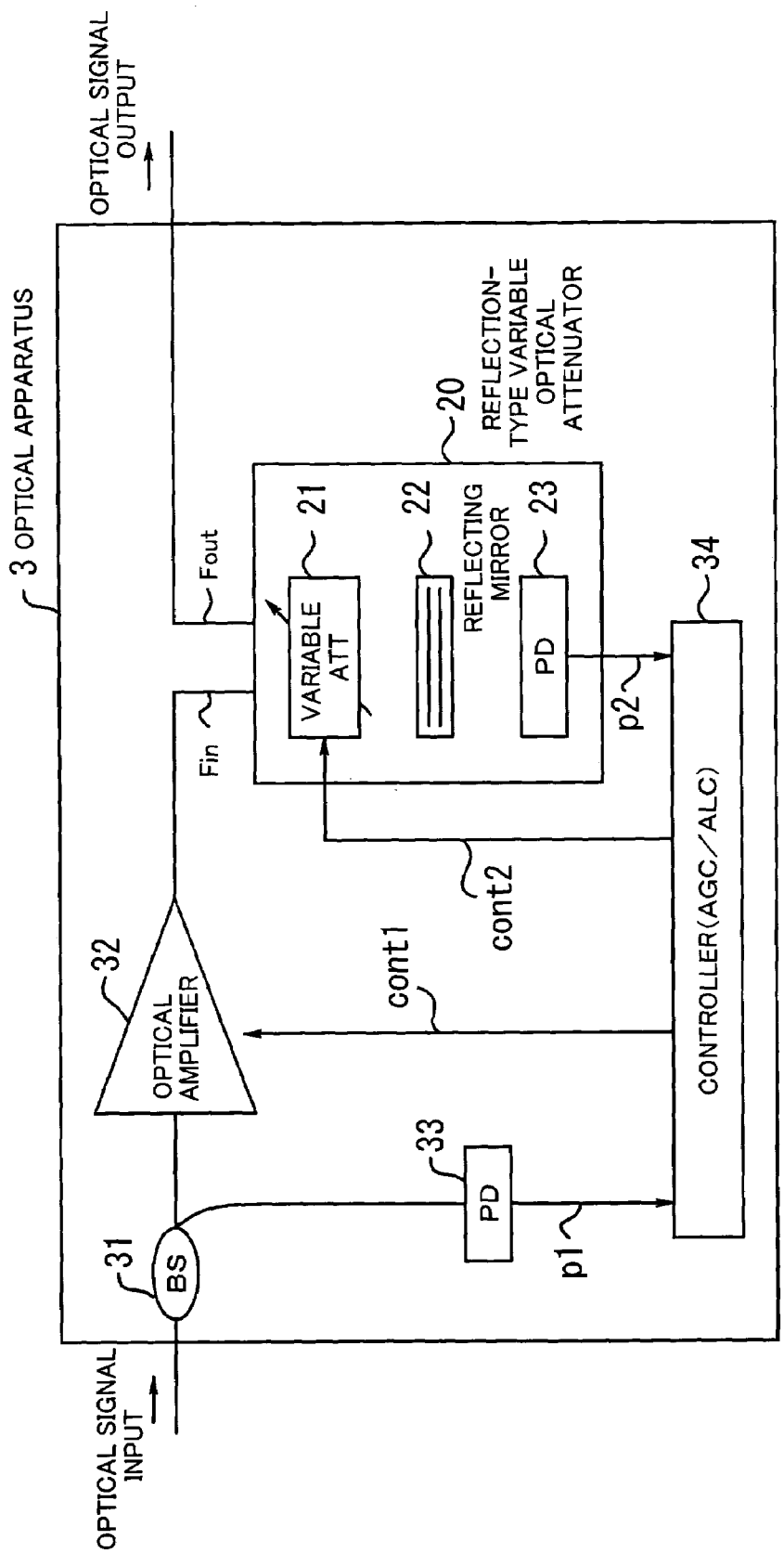
FIG. 5 shows the configuration of an optical apparatus having an AGC/ALC function.

An optical apparatus having an AGC (Automatic Gain Control)/ALC (Automatic Level Control) function will be now described with reference to FIG. 5 showing the configuration thereof. The optical apparatus 3 comprises a beam splitter 31, an optical amplifier 32 (including elements having the same functions as those of the optical amplifier 11 shown in FIG. 1), a PD 33 (input-side light receiving element), a controller 34, and the reflection-type variable optical attenuator 20. The control type of the reflection-type variable optical attenuator 20 is a feedforward type. In the figure, the gain equalizer and the optical isolator for cutting off feedback light are omitted.

An optical signal split by the beam splitter 31 is converted to an electrical signal by the PD 33, which then outputs a monitored value p1. The PD 23 in the reflection-type variable optical attenuator 20 outputs a monitored value p2 of the amplified optical signal.

The controller 34 performs AGC with respect to the optical amplifier 32 and also performs ALC through the variable attenuator 21 in the reflection-type variable optical attenuator 20. In the case of carrying out AGC, the controller 34 detects the input/output gain ratio from the monitored values p1 and p2, and outputs a control signal contl to adjust the pump light power of the pump light source in the optical amplifier 32 so that the p1/p2 ratio of the monitored values may be kept constant. Also, in the case of performing ALC, the controller adjusts the strength of the magnetic field applied by the magnetic field application unit 21e in the variable attenuator 21 in accordance with change in the monitored value p2, to thereby adjust the signal level.

The AGC/ALC control is performed in the following manner: If the input to the optical amplifier 32 increases by +1 dB, for example, AGC works and causes the optical amplifier 32 to provide an output increased by +1 dB, thereby keeping the input/output ratio constant. Then, ALC works and causes the variable attenuator 21 to attenuate the signal by −1 dB, thereby maintaining the output level at a constant value.

Figure 6:
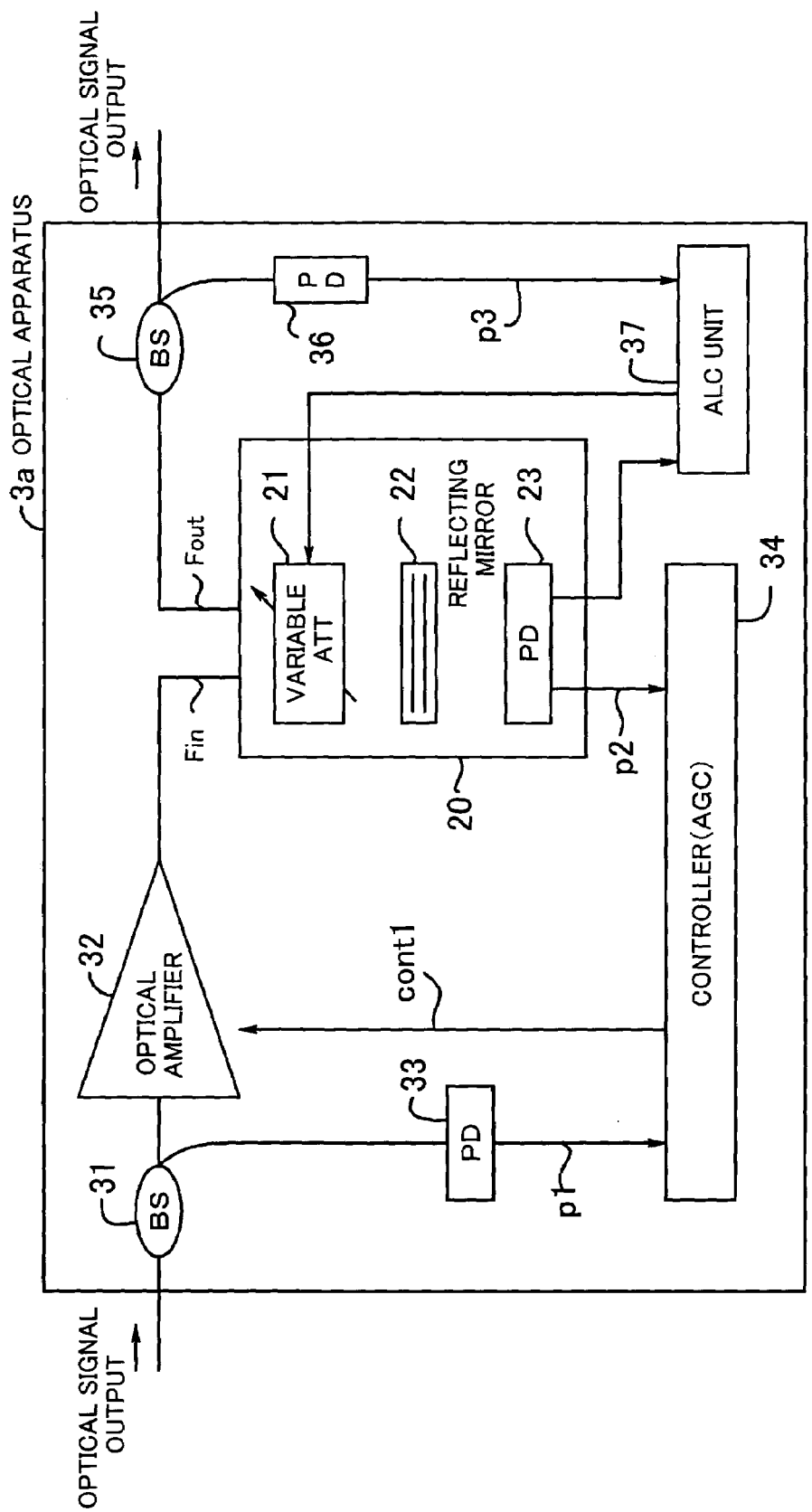
FIG. 6 shows the configuration of another optical apparatus with the AGC/ALC function.

FIG. 6 shows the configuration of another optical apparatus with the AGC/ALC function. The optical apparatus 3a comprises beam splitters 31 and 35, the optical amplifier 32 (including elements having the same functions as those of the optical amplifier 11 shown in FIG. 1), the PD 33 (input-side light receiving element), a PD 36 (output-side light receiving element), the controller (AGC unit) 34, an ALC unit 37, and the reflection-type variable optical attenuator 20. The control type of the reflection-type variable optical attenuator 20 is a feedback type. In the figure, the gain equalizer and the optical isolator for cutting off feedback light are omitted.

The AGC/ALC control operation of the illustrated device differs from that of the device shown in FIG. 5 in the following respects: Based on the monitored value p1 from the PD 33 and the monitored value p2 from the reflection-type variable optical attenuator, the controller 34 performs AGC with respect to the optical amplifier 32 so as to keep the gain constant. Also, based on a monitored value p3 from the PD 36, the ALC unit 37 performs ALC with respect to the attenuation control by the reflection-type variable optical attenuator 20 so as to keep the optical output level constant.

Figure 7:
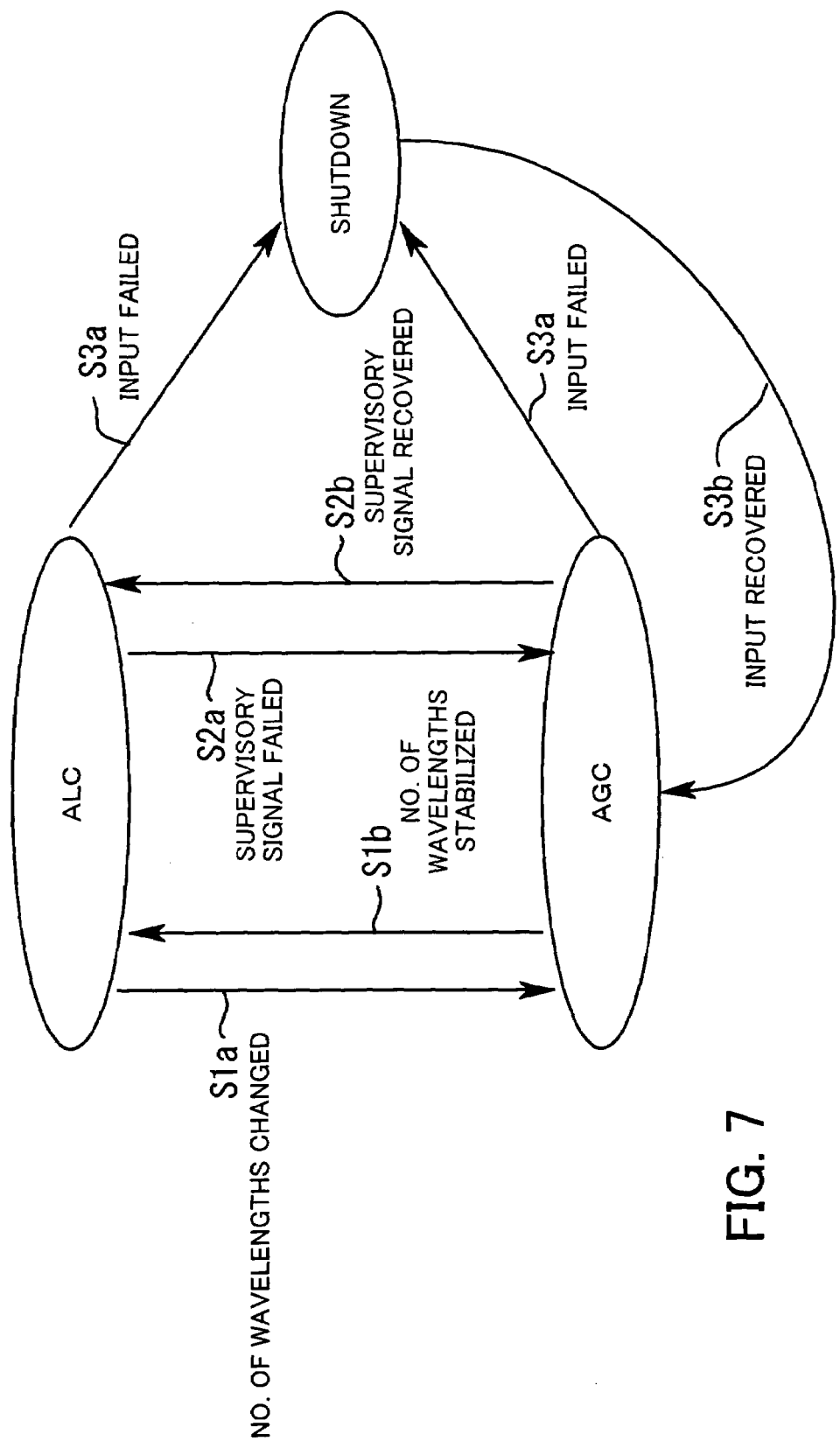
FIG. 7 shows AGC/ALC/shutdown state transitions.

FIG. 7 shows AGC/ALC/shutdown state transitions.

[S1a] If the number of wavelengths multiplexed by WDM changes during the ALC operation, a transition to AGC takes place.

[S1b] If the number of wavelengths is stabilized during the AGC operation, a transition to ALC takes place.

[S2a] If, during the ALC operation, a fault occurs in a supervisory signal (e.g., OSC (Optical Supervisory Channel) signal or SV (supervisory) signal) including information about the number of wavelengths and wavelength operation information indicative of in-service wavelengths (e.g., failure to detect information due to step-out or the like), a transition to AGC takes place.

[S2b] If the supervisory signal recovers during the AGC operation, a transition to ALC takes place.

[S3a] If, during the ALC or AGC operation, at least one of the main optical signal and the supervisory signal fails to be received and thus input failure occurs, a transition to shutdown (the output of the pump light source in the optical amplifier 32 is automatically stopped and thus the amplification function of the optical amplifier 32 is disabled) takes place.

[S3b] If the input recovers during the shutdown, a transition to AGC takes place.

Figure 8:
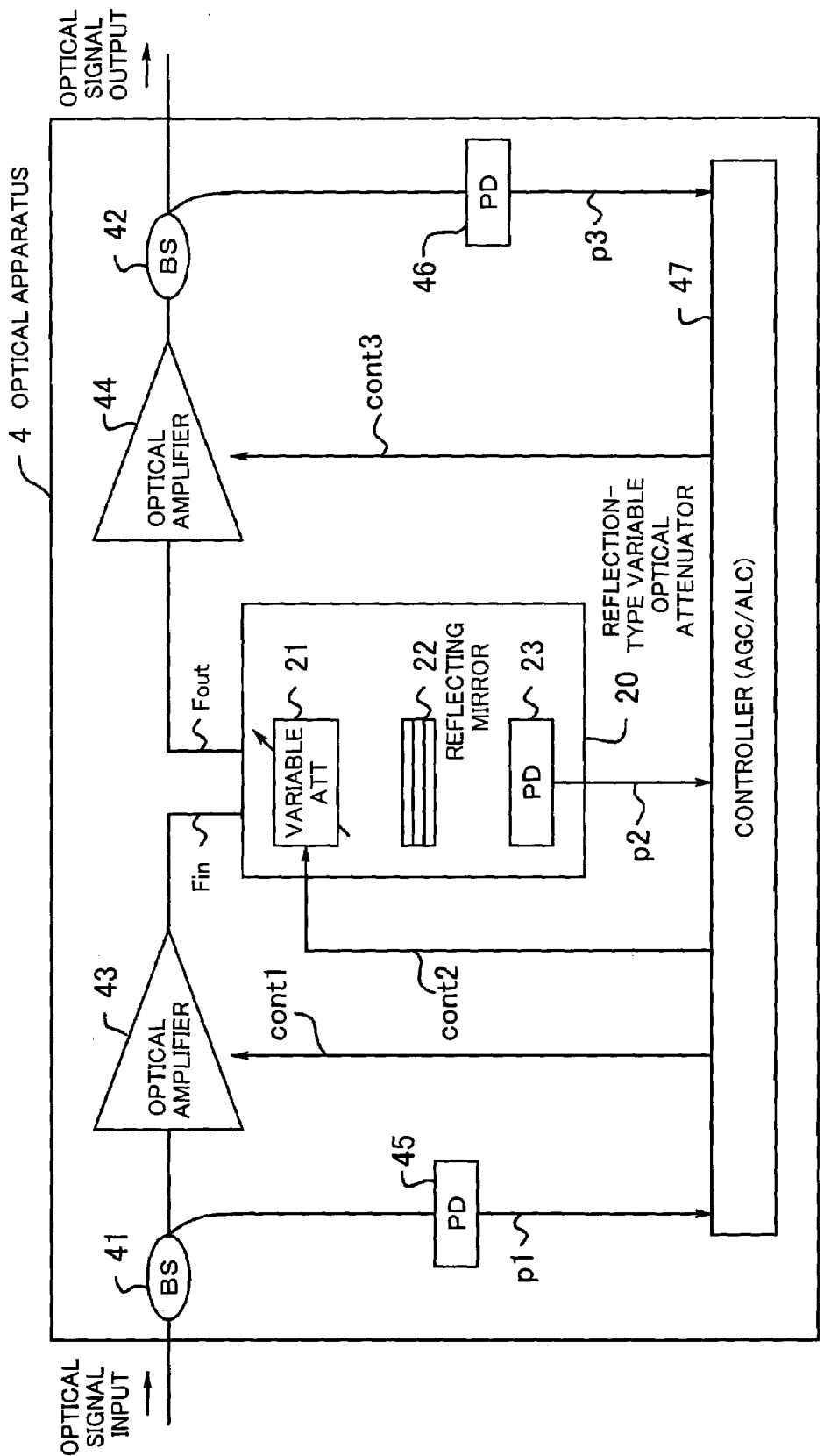
FIG. 8 shows the configuration of an optical apparatus having the AGC/ALC function.

FIG. 8 shows the configuration of an optical apparatus having the AGC/ALC function. The optical apparatus 4 comprises beam splitters 41 and 42, optical amplifiers 43 and 44 (each including elements having the same functions as those of the optical amplifier 11 shown in FIG. 1), a PD 45 (input-side light receiving element), a PD 46 (output-side light receiving element), a controller 47, and the reflection-type variable optical attenuator 20. The control type of the reflection-type variable optical attenuator 20 is a feedforward type. In the figure, the gain equalizer and the optical isolator for cutting off feedback light are omitted.

An optical signal split by the beam splitter 41 is converted to an electrical signal by the PD 45, which then outputs a monitored value p1. The PD 23 in the reflection-type variable optical attenuator 20 outputs a monitored value p2 of the amplified optical signal. Further, an optical signal split by the beam splitter 42 is converted to an electrical signal by the PD 46, which then outputs a monitored value p3.

The controller 47 performs AGC with respect to the optical amplifier 43 and also performs ALC through the variable attenuator 21 in the reflection-type variable optical attenuator 20. In the case of carrying out AGC, the controller 47 detects the input/output gain ratio from the monitored values p1 and p2, and outputs a control signal cont1 to adjust the pump light power of the pump light source in the optical amplifier 43 so that the p1/p2 ratio of the monitored values may be kept constant. Also, in the case of performing ALC, the controller adjusts the strength of the magnetic field applied by the magnetic field application unit 21e in the variable attenuator 21 in accordance with change in the monitored value p2.

Further, the controller 47 performs AGC with respect to the optical amplifier 44. In this case, the controller detects the input/output gain ratio from the monitored values p2 and p3, and outputs a control signal cont3 to adjust the pump light power of the pump light source in the optical amplifier 44 so that the p2/p3 ratio of the monitored values may be kept constant.

When performing AGC, the controller 47 may control the optical amplifiers 43 and 44 separately so that the gains G1 and G2 of the two optical amplifiers may individually be kept constant. Alternatively, the optical amplifiers may be controlled as a group so that the sum of the gains G1 and G2 may be kept constant. The AGC/ALC/shutdown state transitions of the optical apparatus 4 are identical with those shown in FIG. 7, and accordingly, description thereof is omitted.

Figure 9:
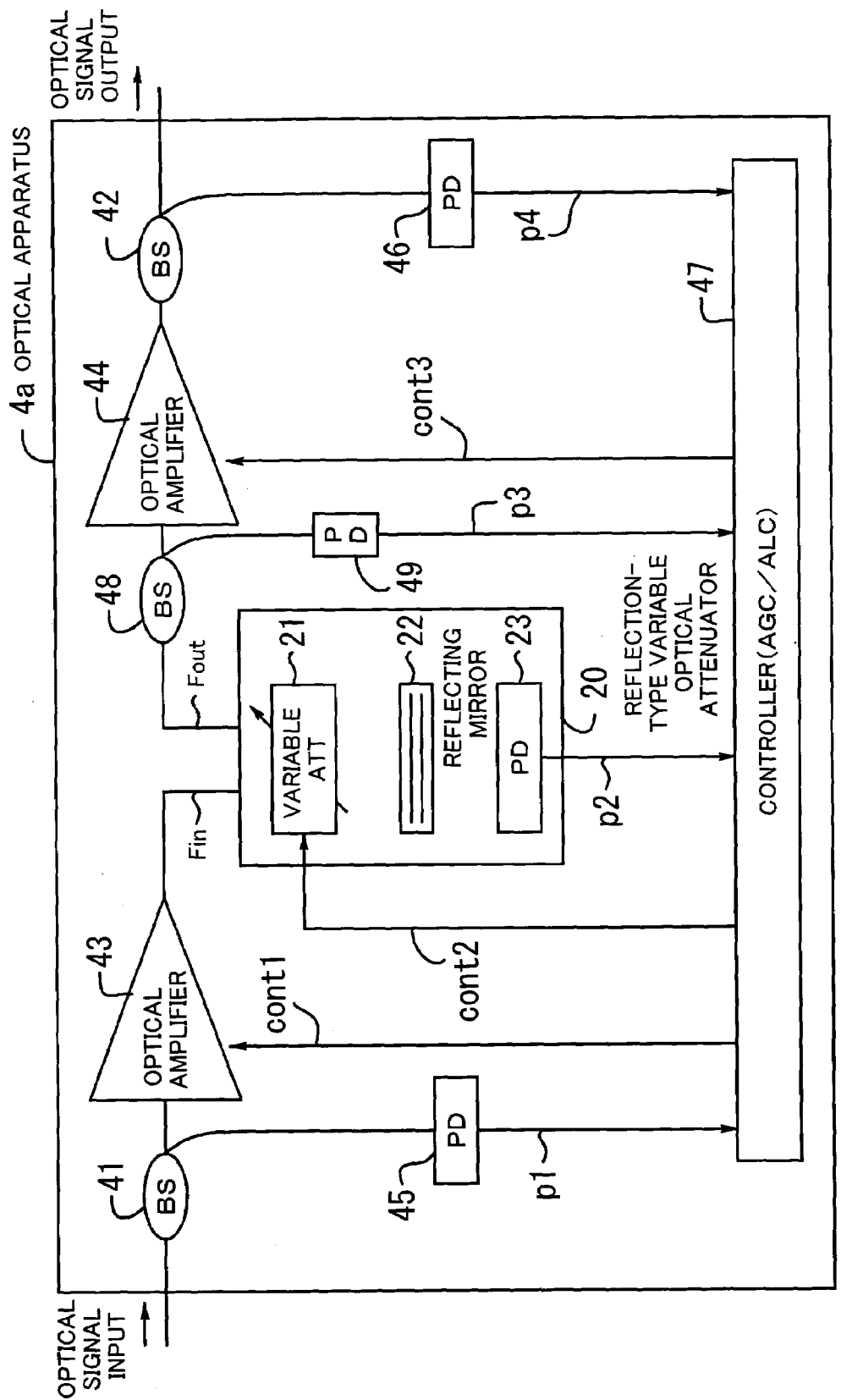
FIG. 9 shows the configuration of another optical apparatus with the AGC/ALC function.

FIG. 9 shows the configuration of another optical apparatus with the AGC/ALC function. The optical apparatus 4a comprises beam splitters 41, 42 and 48, the optical amplifiers 43 and 44 (each including elements having the same functions as those of the optical amplifier 11 shown in FIG. 1), the PD 45 (input-side light receiving element), the PD 46 (output-side light receiving element), a PD 49 (light receiving element), the controller 47, and the reflection-type variable optical attenuator 20. The control type of the reflection-type variable optical attenuator 20 is a feedback type. In the figure, the gain equalizer and the optical isolator for cutting off feedback light are omitted.

The AGC/ALC control operation of the illustrated device differs from that of the device shown in FIG. 8 in the following respects: Based on the monitored value p1 from the PD 45 and the monitored value p2 from the reflection-type variable optical attenuator 20, the controller 47 performs AGC with respect to the optical amplifier 43 to keep the gain constant. Also, based on monitored values p3 and p4 from the PD's 49 and 46, the controller performs AGC so that the sum of the gains of the optical amplifiers 43 and 44 may be kept constant, and based on at least one of the monitored values p1 to p4, the controller controls the attenuation control by the reflection-type variable optical attenuator 20 so that the optical output level may be kept constant.

Alternatively, based on the monitored values p1, p2 and p3 from the PD 45, the reflection-type variable optical attenuator 20 and the PD 49, the controller 47 performs AGC so that the sum of the gains of the optical amplifiers 43 and 44 may be kept constant, and also, based on at least one of the monitored values p1 to p4, the controller controls the attenuation control by the reflection-type variable optical attenuator so that the optical output level may be kept constant.

As explained above, the optical apparatus of FIGS. 5 to 9 include the reflection-type variable optical attenuator 20 and are configured such that AGC/ALC is performed by the respective controllers. Where AGC is performed on both of the two optical amplifiers, additional beam splitters and PD's are required, but even in such configuration, the number of components can be reduced, compared with conventional devices.

Let it be assumed that the control performed in the optical apparatus 4 of FIG. 8, for example, is to be carried out in a conventional device not provided with the reflection-type variable optical attenuator 20. In this case, to monitor the output and input levels of the optical amplifiers 43 and 44, two beam splitters and two PDs must be additionally arranged between the optical amplifiers 43 and 44. In the optical apparatus 4 of the present invention, by contrast, the single PD 23 in the reflection-type variable optical attenuator 20 is used for monitoring both the output level of the optical amplifier 43 and the input level of the optical amplifier 44, and thus the number of components can be reduced (also, no beam splitters need to be provided between the optical amplifiers 43 and 44).

Figure 10:
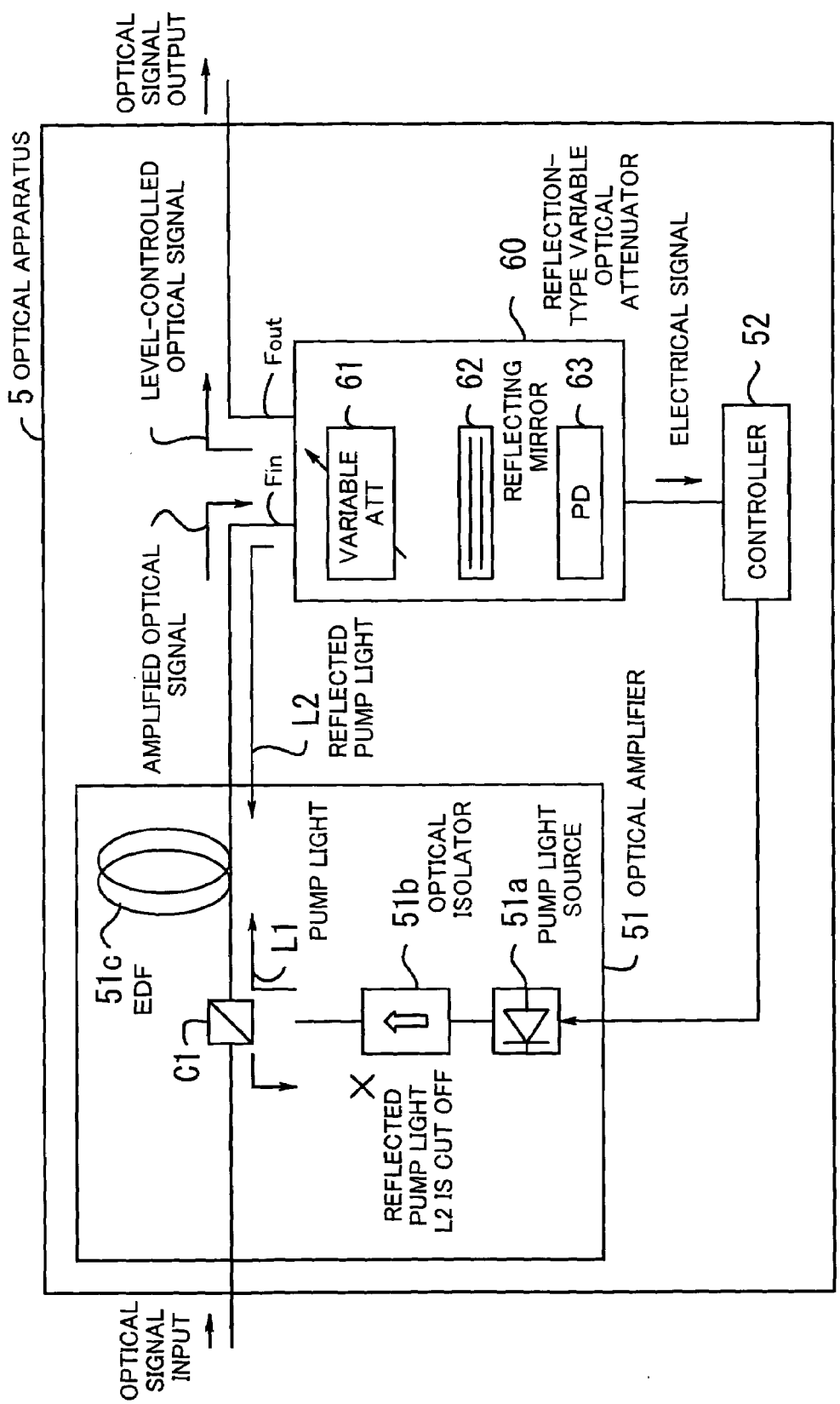
FIG. 10 shows the configuration of still another optical apparatus.

An optical apparatus according to another embodiment of the present invention will be now described with reference to FIG. 10 showing the configuration thereof. The optical apparatus 5 comprises an optical amplifier 51, a controller 52, and a reflection-type variable optical attenuator 60 (in the figure, the gain equalizer and the optical isolator for cutting off feedback light are omitted). The optical amplifier 51 includes a pump light source 51a, an optical isolator 51b, an EDF 51c, and a coupler C1. The reflection-type variable optical attenuator 60 includes a variable attenuator 61, a reflecting mirror 62, and a PD 63.

In the optical amplifier 51, pump light L1 from the pump light source 51a is introduced into the EDF 51c through the optical isolator 51b and the coupler C1. After passing through the EDF 51c, the pump light L1 is reflected by the reflection-type variable optical attenuator 60 and reenters the EDF 51c as reflected pump light L2. The pump light L1 propagated in the direction of travel of an optical signal and the reflected pump light L2 propagated in the opposite direction cause optical amplification, whereby the amplified optical signal is output from the EDF 51c. Since the optical isolator 51b is arranged in the illustrated position, the reflected pump light L2 is cut off by the optical isolator 51b and never enters the pump light source 51a.

The configuration and operation of the reflection-type variable optical attenuator 60 are basically the same as those of the reflection-type variable optical attenuator 20 explained above with reference to FIGS. 2 and 3. The difference between the two is that a film for reflecting the pump light L1 to generate the reflected pump light L2 is coated on the surface of an element of the reflection-type variable optical attenuator 60 through which the optical signal passes.

Figure 11:
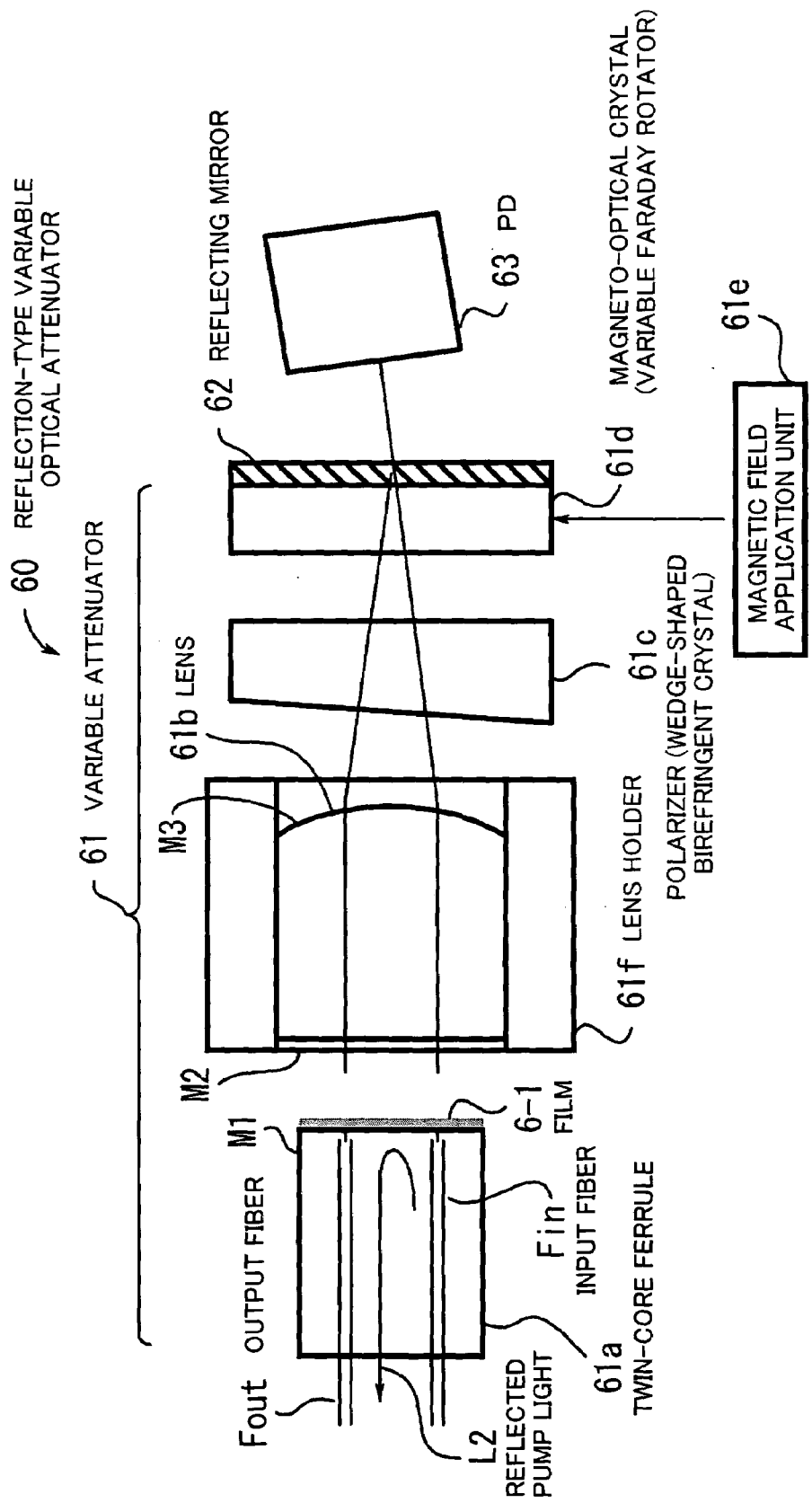
FIG. 11 shows the configuration of a reflection-type variable optical attenuator.

FIG. 11 shows the configuration of the reflection-type variable optical attenuator 60. The reflection-type variable optical attenuator 60 comprises a twin-core ferrule 61a, a lens 61b, a lens holder 61f, a polarizer 61c, a magneto-optical crystal 61d, a magnetic field application unit 61e, the reflecting mirror 62, and the PD 63. A film 6-1, which does not reflect the main optical signal but reflects the pump light L1 to generate the reflected pump light L2, is coated on the illustrated surface M1 of the twin-core ferrule 61a through which the optical signal passes. The reflectance of the film 6-1 is set such that the reflectance with respect to light having a wavelength of 1 micron or less is not lower than 1%, for example.

By coating the film 6-1, it is possible to reflect the pump light L1 to be redirected to the EDF 51c. This makes it possible to improve the amplification efficiency and thus to lower the pump power of the pump light source 51a (the film 6-1 may alternatively be coated on the surface M2 or M3 of the lens 61b through which the optical signal passes).

Also, since the coating film 6-1 having high reflectance with respect to the pump light with a wavelength of 1 micron or less is arranged at the illustrated position, the pump light does not reach the magneto-optical crystal 61d, thereby preventing the magneto-optical crystal 61d from absorbing the pump light. It is therefore possible to lessen generation of heat as well as deterioration in characteristics attributable to absorption of the pump light with a wavelength of 1 micron or less by the magneto-optical crystal 61d.

As described above, the optical apparatus of the present invention comprises an optical amplifier, and a reflection-type variable optical attenuator including a reflecting mirror for reflecting an input light to generate a reflected light and a magneto-optical crystal arranged in a position where the input and reflected lights pass. The magneto-optical crystal is applied with a magnetic field to induce a Faraday rotation angle therein and thereby vary the amount of attenuation of the amplified optical signal, and part of light transmitted through the reflecting mirror is converted, as input monitor light, to an electrical signal. Accordingly, the number of optical devices arranged in the main optical signal transmission path, such as optical isolators and beam splitters, can be reduced, making it possible to reduce the size and cost of optical repeaters or optical apparatus and also to improve the optical transmission quality.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An optical apparatus, comprising:
   an optical amplifier including an amplification medium which is doped with an active material for optical amplification and to which pump light is introduced, for amplifying an optical signal and outputting the amplified optical signal;
   a reflection-type variable optical attenuator including a reflecting mirror and a light receiving element;
   wherein the reflection-type variable optical attenuator is connected with the optical amplifier through an input fiber directly, and is input via the input fiber with the amplified optical signal, then performs attenuation control on the input light, and outputs an attenuation-controlled optical signal from an output fiber,
   wherein the reflecting mirror reflects the input light to generate a reflected light, and a magneto-optical crystal arranged in a position where the input light and the reflected light pass, the magneto-optical crystal being applied with a magnetic field to induce a Faraday rotation angle therein and thereby vary an amount of attenuation of the amplified optical signal, and part of light transmitted through the reflecting mirror being converted, as input monitor light, into an electrical signal, wherein the light receiving element converts the part of the light transmitted through the reflecting mirror, as the input monitor light, into the electrical signal, and wherein the light receiving element is displaced from an optical axis of feedback light which is returned from a reflecting point succeeding the reflection-type variable optical attenuator after being emitted from an output fiber, so as not to detect the feedback light which includes noise, when the light receiving element is arranged behind the reflecting mirror, and no optical isolator is used between the reflecting mirror and the light receiving element; and a controller to monitor the electrical signal and, in accordance with the monitoring result, controls the pump light power.

2. The optical apparatus according to claim 1, wherein the pump light introduced to the optical amplifier has a wavelength of 1 μm or less.

3. The optical apparatus according to claim 1, wherein the reflection-type variable optical attenuator includes a twin-core ferrule having two optical fiber insertion holes into which are inserted an optical fiber for inputting the amplified optical signal and an optical fiber for outputting an attenuation-controlled optical signal, respectively, a lens for focusing light, a polarizer for transmitting a linearly polarized light of light therethrough, the reflecting mirror for reflecting an input light to generate a reflected light, the magneto-optical crystal arranged in a position where the input light and the reflected light pass, the magneto-optical crystal being applied with a magnetic field to induce a change of Faraday rotation angle therein and thereby vary an amount of attenuation of the amplified optical signal, a magnetic field application unit for applying the magnetic field to the magneto-optical crystal, and a light receiving element for converting part of light transmitted through the reflecting mirror, as the input monitor light, into an electrical signal.

4. The optical apparatus according to claim 3, wherein the reflection-type variable optical attenuator is configured such that a distance L (mm) of the light receiving element from a back of the reflecting mirror falls within a range of:

$$L > \{((4\lambda f/\pi w) + \phi)\cos(\theta/2)\}/4 \tan(\theta/2)$$

where θ (deg) is an angle between feedback light and the input monitor light, φ (mm) is a size of a light receiving surface of the light receiving element, f (mm) is a focal distance of the lens, λ (μm) is a wavelength of the light, and w (μm) is a mode field diameter of the light in the fiber, thereby suppressing input of the feedback light to the light receiving element.

5. An optical apparatus, comprising:

an optical amplifier including an amplification medium which is doped with an active material for optical amplification and to which pump light is introduced, for amplifying an optical signal and outputting the amplified optical signal;

a reflection-type variable optical attenuator is connected with the optical amplifier through an input fiber directly, and is input via the input fiber with the amplified optical signal, then performs attenuation control on the input light, and outputs an attenuation-controlled optical signal from an output fiber, wherein the reflection-type variable optical attenuator including a reflecting mirror for reflecting the input light to generate a reflected light, and a magneto-optical crystal arranged in a position where the input light and the reflected light pass, the magneto-optical crystal being applied with a magnetic field to induce a Faraday rotation angle therein and thereby vary an amount of attenuation of the amplified optical signal, and part of light transmitted through the reflecting mirror being converted, as input monitor light, into an electrical signal, wherein the reflection-type variable optical attenuator includes a twin-core ferrule having two optical fiber insertion holes into which are inserted the input fiber and the output fiber, respectively, a lens for focusing light, a polarizer for transmitting a linearly polarized light of light therethrough, a magnetic field application unit for applying the magnetic field to the magneto-optical crystal, and a light receiving element for converting the part of the light transmitted through the reflecting mirror, as the input monitor light, into the electrical signal, and wherein the light receiving element is displaced from an optical axis of feedback light which is returned from a reflecting point succeeding the reflection-type variable optical attenuator after being emitted from an output fiber, so as not to detect the feedback light which includes noise, when the light receiving element is arranged behind the reflecting mirror, and no optical isolator is used between the reflecting mirror and the light receiving element; and a controller to monitor the electrical signal and, in accordance with the monitoring result, controls the pump light power.

* * * * *